(12) United States Patent
Tiwari et al.

(10) Patent No.: US 11,275,601 B2
(45) Date of Patent: Mar. 15, 2022

(54) SYSTEM AND METHOD FOR AUTO RECOVERY OF DELETED VIRTUAL MACHINES IDENTIFIED THROUGH COMPARISON OF VIRTUAL MACHINE MANAGEMENT APPLICATION SNAPSHOTS AND HAVING CORRESPONDING BACKUPS AT A STORAGE DEVICE

(71) Applicant: EMC IP Holding Company LLC, Hopkinton, MA (US)

(72) Inventors: Priyank Tiwari, Bangalore (IN); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 250 days.

(21) Appl. No.: 16/394,510

(22) Filed: Apr. 25, 2019

(65) Prior Publication Data
US 2020/0341787 A1   Oct. 29, 2020

(51) Int. Cl.
*G06F 9/455*   (2018.01)
*G06F 11/14*   (2006.01)

(52) U.S. Cl.
CPC ...... *G06F 9/45558* (2013.01); *G06F 11/1484* (2013.01); *G06F 11/1448* (2013.01); *G06F 11/1461* (2013.01); *G06F 2009/45562* (2013.01); *G06F 2009/45575* (2013.01); *G06F 2201/815* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 9,128,742 B1 * | 9/2015 | Akolkar | G06F 9/45558 |
| 9,396,071 B1 * | 7/2016 | Akanda | G06F 9/45533 |
| 9,740,577 B1 * | 8/2017 | Chakraborty | G06F 11/1469 |
| 10,908,835 B1 * | 2/2021 | Patel | G06F 11/1469 |
| 2004/0128670 A1 * | 7/2004 | Robinson | G06F 9/45558 718/1 |
| 2012/0017114 A1 * | 1/2012 | Timashev | G06F 11/1451 714/15 |
| 2012/0072685 A1 * | 3/2012 | Otani | G06F 11/1458 711/162 |
| 2012/0084262 A1 * | 4/2012 | Dwarampudi | G06F 11/1448 707/667 |
| 2014/0095816 A1 * | 4/2014 | Hsu | G06F 11/1469 711/162 |
| 2014/0181294 A1 * | 6/2014 | Deshpande | G06F 9/485 709/224 |
| 2018/0173550 A1 * | 6/2018 | Court | G06F 11/34 |

* cited by examiner

*Primary Examiner* — Michael W Ayers
(74) *Attorney, Agent, or Firm* — Chamberlain, Hrdlicka, White, Williams & Aughtry

(57) ABSTRACT

A method for managing virtual machines includes selecting a virtual machine (VM) on a recoverable deleted VMs List, and initiating recovery of the VM on the production host.

14 Claims, 7 Drawing Sheets

SYSTEM AND METHOD FOR AUTO RECOVERY OF DELETED VIRTUAL MACHINES IDENTIFIED THROUGH COMPARISON OF VIRTUAL MACHINE MANAGEMENT APPLICATION SNAPSHOTS AND HAVING CORRESPONDING BACKUPS AT A STORAGE DEVICE

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method for managing virtual machines. The method includes selecting a virtual machine (VM) on a recoverable deleted VMs List, and initiating recovery of the VM on the production host.

In one aspect, a non-transitory computer readable medium in accordance with one or more embodiments of the invention includes computer readable program code, which when executed by a computer processor enables the computer processor to perform a method for managing virtual machines. The method includes selecting a virtual machine (VM) on a recoverable deleted VMs List, and initiating recovery of the VM on the production host.

In one aspect, a system in accordance with one or more embodiments of the invention includes a processor and memory which includes instructions, which when executed by the processor, perform a method for managing virtual machines. The method includes selecting a virtual machine (VM) on a recoverable deleted VMs List, and initiating recovery of the VM on the production host.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing virtual machines. More specifically, embodiments of the invention relate to a system for generating snapshots of one or more virtual machine management applications (VMMAs) each managing one or more virtual machines and identifying whether virtual machines have been deleted. Embodiments of the invention may compare the identified deleted VMs to a list of protected VMs (i.e., VMs that may be recovered) to generate a list of deleted recoverable VMs. A virtual operations manager managing the VMMAs may implement policies that determine how to proceed after generating the list. The policies may specify notifying the virtual operations manager of the deleted recoverable VMs to identify VMs to be recovered. Alternatively, a policy may specify automatically recovering the VMs identified in the list of deleted recoverable VMs.

Figure 1:
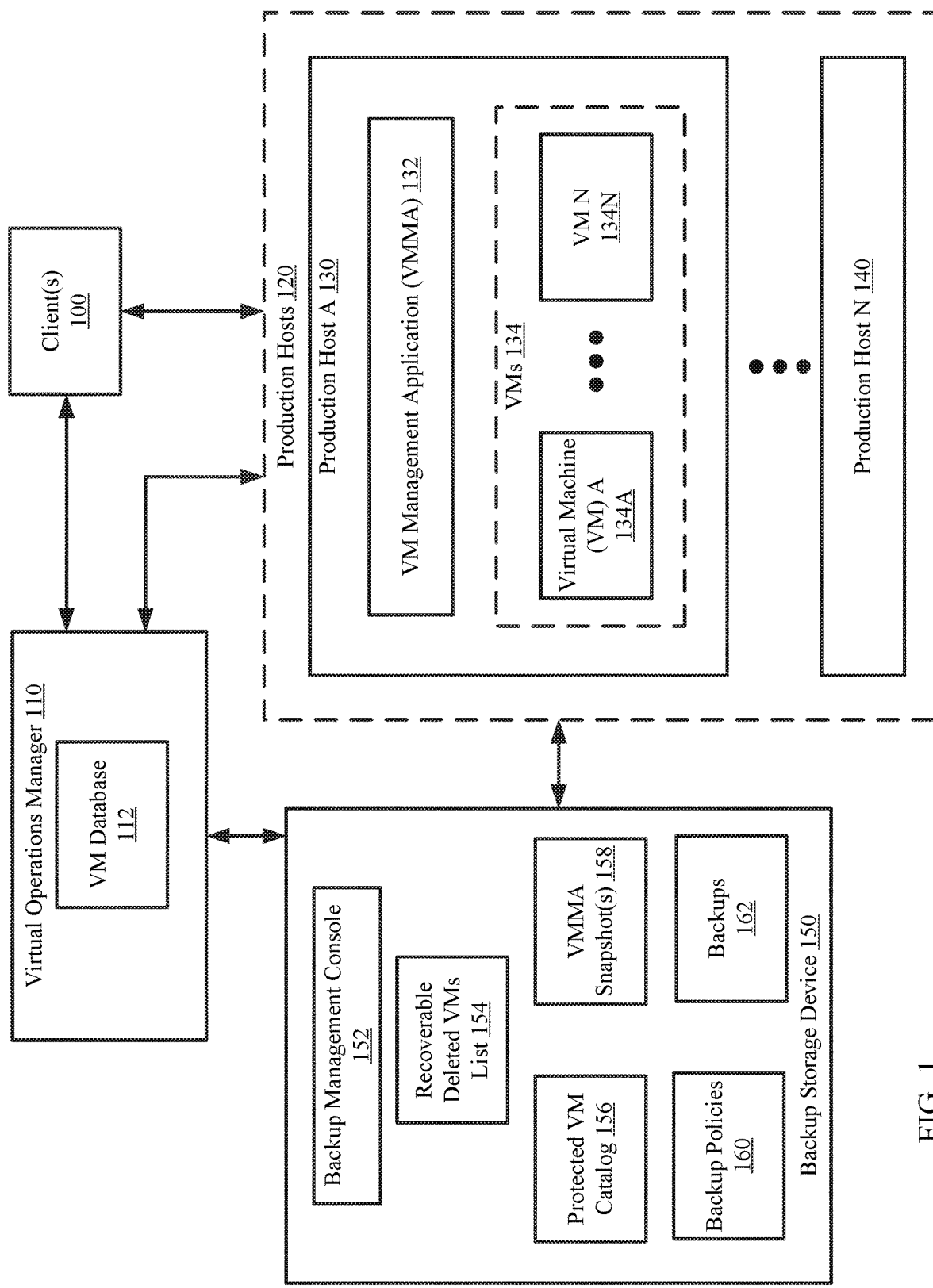
FIG. 1 shows a diagram of a system in accordance with one or more embodiments of the invention.

FIG. 1 shows a diagram of a system in accordance with one or more embodiments of the invention. The system includes clients (100), a virtual operations manager (110), a backup storage device (150), and production hosts (120). The system may include additional, fewer, and/or different components without departing from the invention. Each component may be operably connected via any combination of wired and/or wireless connections. Each component illustrated in FIG. 1 is discussed below.

In one or more embodiments of the invention, the clients (100) are devices, operated by users, that utilized data generated by the production hosts (120). The clients (100) may send requests to the production hosts (120) to obtain the data to be utilized. Additionally, the clients may communicate with the virtual operations manager (110) when managing virtual machines (134) hosted by the production hosts (120). The clients may send requests to the virtual operations manager (110) to obtain updates about the status of the virtual machines (VMs) (134). The updates may specify whether a VM (144A, 144N) has been deleted.

In one or more embodiments of the invention, the clients (100) are notified of a deletion of protected VMs from the virtual operations manager (110). The clients (100) may use the notification to send a request the virtual operations manager (110) to recover one or more of the deleted protected VMs.

Figure 4:
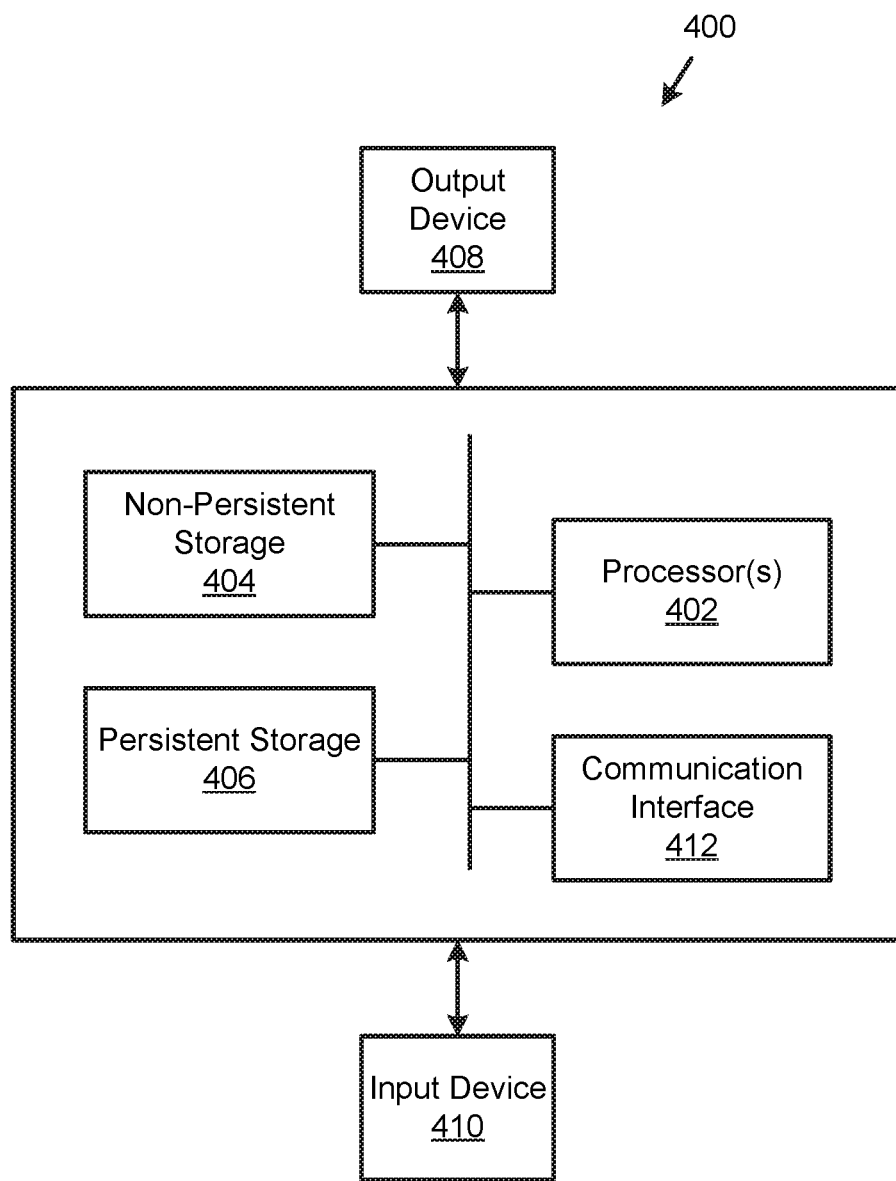
FIG. 4 shows a diagram of a computing device in accordance with one or more embodiments of the invention.

In one or more embodiments of the invention, one or more clients (100) are implemented as computing devices (see e.g., FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a client described throughout this application.

In one or more embodiments of the invention, one or more clients (100) are implemented as a logical device. The logical device may utilize the computing resources of any number of computing devices and thereby provide the functionality of the clients (100) described throughout this application.

In one or more embodiments of the invention, the virtual operations manager (110) is a device that manages multiple virtual machine management applications (e.g., 132). The virtual operations manager (110) communicates with the backup storage device (150) by requesting to identify a list of deleted protected VMs, as requested by a client(s) (100).

In one or more embodiments of the invention, the virtual operations manager (110) stores a VM database (112). The VM database (112) is a data structure that specifies the VMs managed by each VM management application (VMMA) (132). The VM database (112) may specify a status of the VMs (e.g., whether the VMs are deleted). The VM database (112) may be accessed by the clients (100). In one or more embodiments of the invention, the VM database (112) may be updated using information obtained periodically from the VMMAs (132) that specify the VMs (134) managed by the VMMAs and/or the statuses of the VMs (134). In one or more embodiments of the invention, the VM database (112) is updated using information obtained from the backup storage device (150) that specifies VMs that have been deleted and/or are protected (i.e., recoverable) by the backup storage device (150).

In one or more embodiments of the invention, the virtual operations manager (110) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the virtual operations manager (110) described throughout this application.

In one or more embodiments of the invention, the virtual operations manager (110) is implemented as a logical device. The logical device may utilize the computing resources of any number of computing devices and thereby provide the functionality of the virtual operations manager (110) described throughout this application.

In one or more embodiments of the invention, the production hosts (120) each include a VMMA (132) that manage any number of VMs (134). The VMMA may manage the VMs (134) by storing metadata associated with the VMs (134). The metadata may specify, for example, the status of each VM (134A, 134N), applications running on each VM (134A, 134N), computing resource information of the VMs (134), and/or other data associated with the VMs (134) without departing from the invention.

In one or more embodiments of the invention, the VMs (134) of a production host (e.g., 130) operate using computing devices that share a geographical location (e.g., a city). Sharing a geographical location may allow the VMs (134) of the production host (130) to utilize a localized network when communicating within the VMs (134) and with the respective VMMA (132).

In one or more of embodiments of the invention, the virtual machines (134) are implemented as computer instructions, e.g., computer code, stored on a persistent storage (e.g., on the production host (130)) that when executed by a processor(s) of the production host (130) cause the production host (130) to provide the functionality of the virtual machines (134) described throughout this application.

In one or more embodiments of the invention, the production host (130, 140) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (130, 140) described throughout this application.

In one or more embodiments of the invention, the production host (130, 140) is implemented as a logical device. The logical device may utilize the computing resources of any number of computing devices and thereby provide the functionality of the production host (130, 140) described throughout this application.

In one or more embodiments of the invention, the backup storage device (150) manages the backups of virtual machines hosted by the production hosts (120). The backup storage device (150) may include a management console (152) that tracks the active virtual machines in the production hosts (120) as well as the virtual machines that have been deleted and are recoverable. The backup management console (152) may generate a recoverable deleted VMs list (154). In one or more embodiments of the invention, the recoverable deleted VMs list (154) is a data structure, stored in memory, that specifies VMs of the production hosts (120) that have been deleted and are recoverable. The recoverable deleted VMs list (154) may be generated by the backup management console (152) by performing the method of FIG. 2A.

In one or more embodiments of the invention, the recoverable deleted VMs list includes a list of VM identifiers. Each VM identifier corresponds to a VM that has been deleted and is recoverable by the backup storage device (150). As used herein, a VM identifier refers to a series of numbers, characters, or symbols used to identify a VM.

Figure 2A:
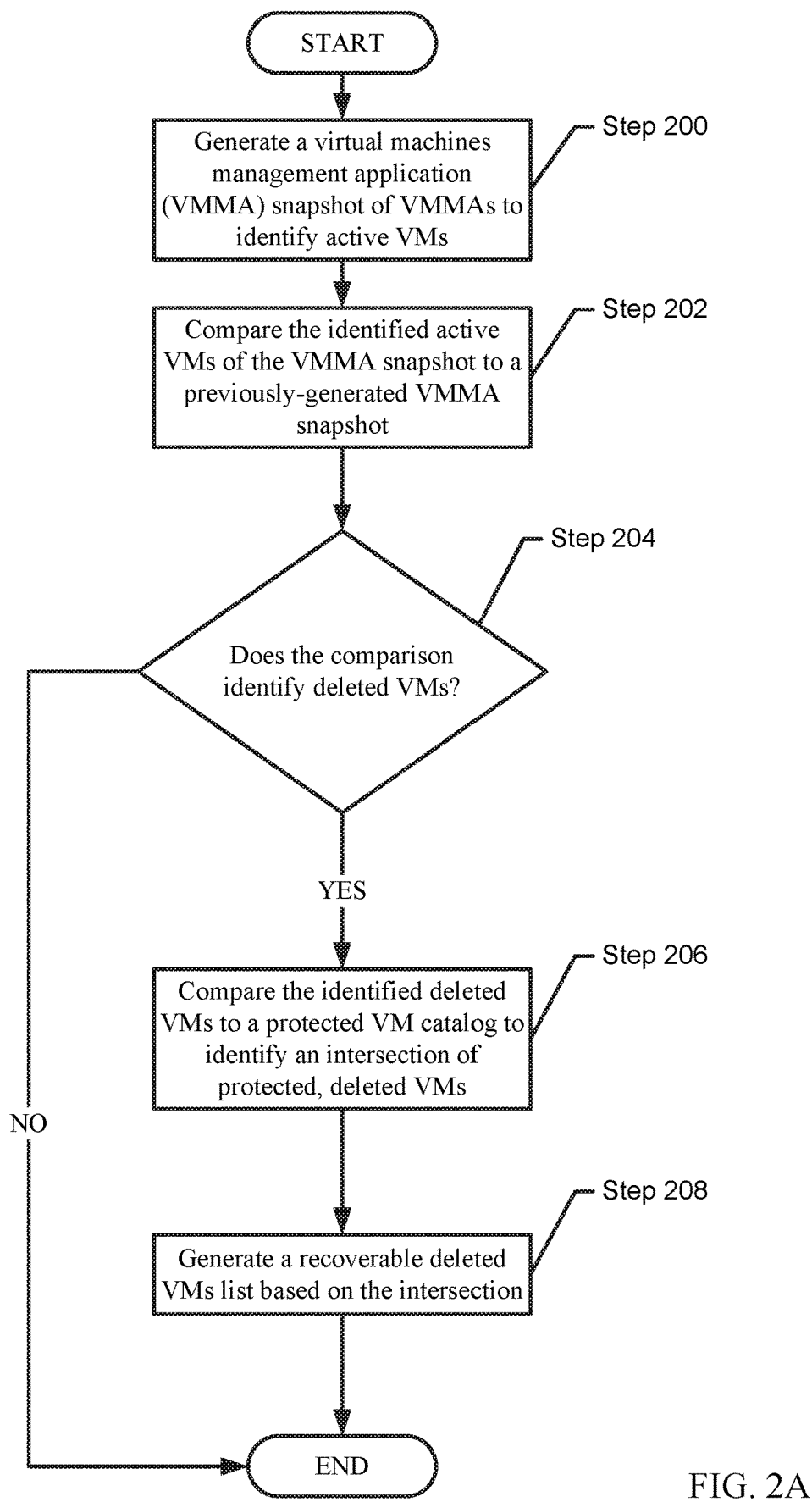
FIG. 2A shows a flowchart for managing virtual machines in accordance with one or more embodiments of the invention.
Figure 2B:
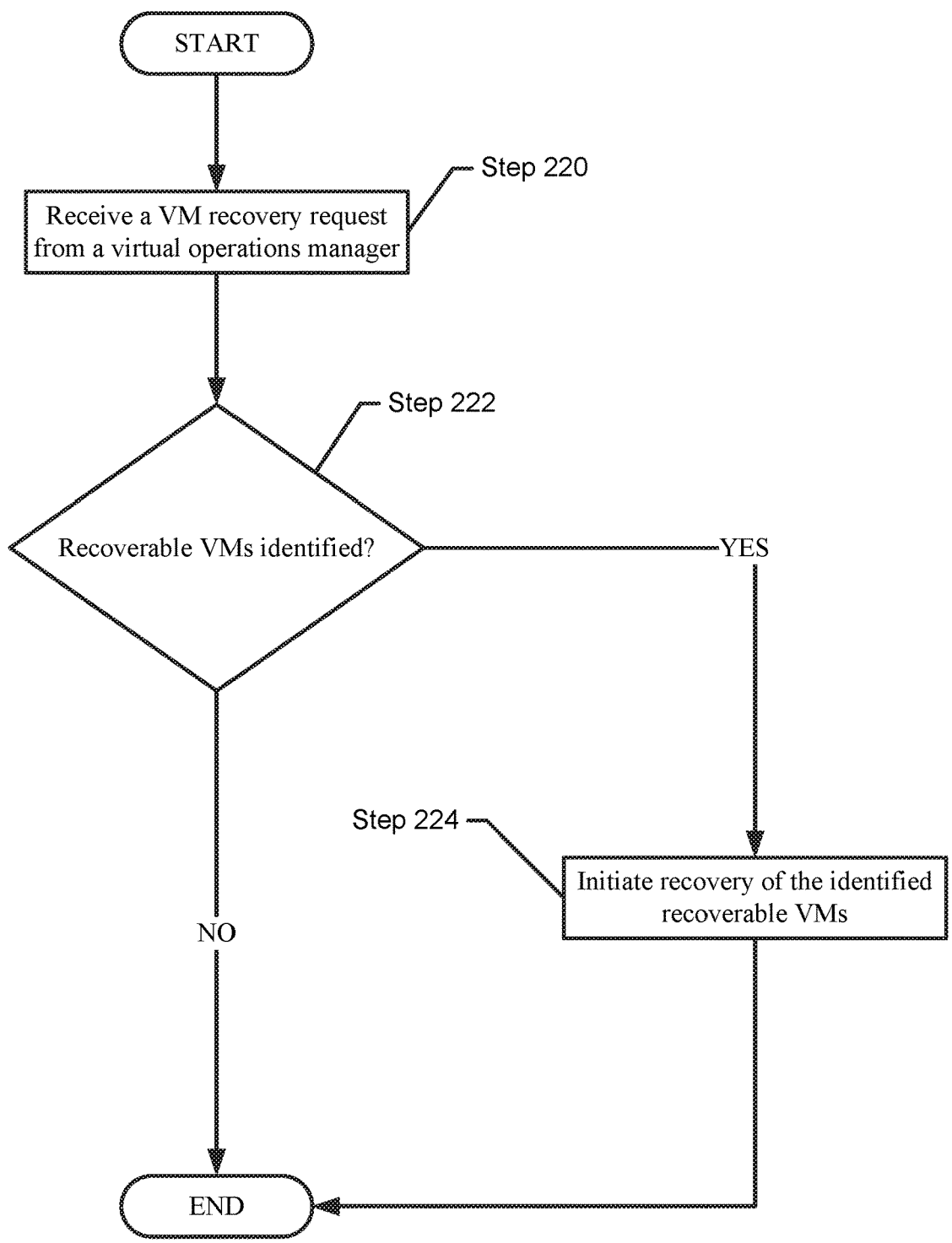
FIG. 2B shows a flowchart for restoring deleted virtual machines in accordance with one or more embodiments of the invention.

In one or more embodiments of the invention, the backup management console (152) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup management console (152)

described throughout this application and/or all, or a portion thereof, of the methods illustrated in FIG. 2A-2B.

In one or more embodiments of the invention, the backup management console (152) is implemented as computer instructions, e.g., computer code, stored on a persistent storage that when executed by a processor of the production host (130, 140) cause the production host (130, 140) to provide the functionality of the backup management console (152) described throughout the application and/or all, or a portion thereof, of the methods illustrated in FIG. 2A-2B.

In one or more embodiments of the invention, the recoverable deleted VMs list (154) is generated using a protected VMs catalog (156). In one or more embodiments of the invention, the protected VMs catalog (156) is a data structure that specifies protected VMs. As used herein, a protected VM refers to a VM for which there is at least one backup stored in the backup storage device (150). The protected VMs catalog (156) may be, for example, a list of VM identifiers, wherein each VM identifier specifies a protected VM.

In one more embodiments of the invention, the recoverable deleted VMs list (154) is generated using VMMA snapshots (158). In one or more embodiments of the invention, the VMMA snapshots (158) are data structures that each specify the active VMs (i.e., 134) managed by a VMMA (e.g., 132). As used herein, an active VM refers to a VM (e.g., 134A, 134N) that has not been deleted. The VMMA snapshot (158) may be generated periodically based on policies (not associated with the backup policies (162) discussed below) implemented by the backup management console (152) that specify when to generate the VMMA snapshots (158). In one or more embodiments of the invention, the snapshots (158) each include VM identifiers that each correspond to an active VM of the respective VMMAs.

In one or more embodiments of the invention, the backup policies (160) are data structures that specify how and when to back up the virtual machines (134) hosted by the production host (130, 140). The backup policies (160) may include entries each specifying a virtual machine and a schedule for when to back up the virtual machine (e.g., every day, every 7 days, every hour, etc.).

In one or more embodiments of the invention, the backup storage device (150) stores backups (162) in persistent storage. The backups (162) may be virtual machine backups (162). In one or more embodiments of the invention, the virtual machine backups (152) include backups of one or more virtual machines (112). A backup may be a data structure that may be used to recover a virtual machine to a previous point in time. The backup may include data of the virtual machine, encrypted data of the virtual machine, metadata that references the data of the virtual machine, and/or other data associated with the virtual machine without departing from the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for managing virtual machines (VMs) in accordance with one or more embodiments of the invention. The method shown in FIG. 2A may be performed by, for example, a backup management console (152, FIG. 1) of a backup storage device (150). Other components of the system illustrated in FIG. 1 may perform the method of FIG. 2A without departing from the invention.

Turning to FIG. 2A, in step 200, a virtual machine management application (VMMA) snapshot is generated. The VMMA snapshot is a snapshot of a VMMA that specifies active VMs managed by the VMMA. The VMMA snapshot may be generated based on a recovery policy implemented by the backup management console in which a snapshot of a VMMA is to be generated periodically (e.g., every day, every 7 days, etc.). In one or more embodiments of the invention, the VMMA snapshot is generated by obtaining metadata stored by the VMMA that specifies the active VMs managed by the VMMA. The VMMA snapshot may include a number of VM identifiers each corresponding to an active VM of the VMMA.

In one or more embodiments of the inventions, the VMMA snapshot is generated using a Representational State transfer (REST) based service. In one or more embodiments of the invention, the REST-based service, implemented by the backup management console, is a service that allows uniform metadata transfer between multiple components in a network. The backup management console may request a VMMA, following a protocol of the REST-based service, to send the metadata associated with the active VMs on the VMMA. The VMMA may send the requested metadata following the protocol of the REST-based service. The metadata may include, for example, uniform resource identifiers (URIs) that each identify the VMMA, an active VM managed by the VMMA, the production host hosting the active VM, or any other entity without departing from the invention.

In step 202, the identified active VMs of the VMMA are compared to a previously-generated VMMA snapshot. In one or more embodiments of the invention, the comparison includes looking at VM identifiers of the previously-generated VMMA snapshot and determining whether each VM identifier in the second VM is included in the second VMMA snapshot (i.e., the VMMA snapshot generated in step 200). A VM may be identified as a deleted VM if it is associated with a VM identifier included in the previously-generated VMMA snapshot and not in the subsequently generated VMMA snapshot.

In step 204, a determination is made about whether the comparison identifies deleted VMs. If the comparison identifies deleted VMs, the method proceeds to step 206; otherwise, the method ends following step 204.

In step 206, the identified deleted VMs are compared to a protected VM catalog to identify an intersection of protected, deleted VMs. In one or more embodiments of the invention, the protected VM catalog specifies a protected VM (i.e., a VM for which a backup may be used to recover the VM). The backup management console may parse the protected VM catalog to identify whether a deleted VM identified in step 202 is protected. A deleted VM identifier may be included in the intersection if the deleted VM identifier is identified in the protected VM catalog.

In step 208, a recoverable deleted VMs list is generated based on the intersection. In one or more embodiments of the invention, the recoverable deleted VMs list is generated by identifying each VM specified in the intersection and, for each identified VM, generating an entry in the recoverable deleted VMs list that includes a VM identifier corresponding to the VM.

In one or more embodiments of the invention, the recoverable deleted VMs list is used to notify the virtual operations manager of deleted VMs that may be recovered. If one or more VMs are specified in the recoverable deleted VMs list, the backup management console may implement a policy in which the backup management console sends a notification to the virtual operations manager that specifies the VMs that are deleted from a production host and recoverable by the backup storage device. The virtual operations manager may use the notification to send a VM recovery request to the backup management console to recover deleted VMs.

In one or more embodiments of the invention, the backup management console implements a policy to automatically recover the VMs specified in the recoverable deleted VMs list. The policy may specify that if the recoverable deleted VMs list specifies one or more VMs list, the backup management console is to recover the specified VMs.

FIG. 2B shows a flowchart for restoring deleted VMs in accordance with one or more embodiments of the invention. The method shown in FIG. 2B may be performed by, for example, a backup management console (152, FIG. 1) of a backup storage device (150). Other components of the system illustrated in FIG. 1 may perform the method of FIG. 2A without departing from the invention.

In step 220, the backup management console receives a VM recovery request from a virtual operations manager. In one or more embodiments of the invention, the VM recovery request specifies deleted VMs to be recovered.

In step 222, a determination is made about whether the backup management console identifies recoverable VMs. In one or more embodiments of the invention, the backup management console may identify VMs that have been deleted and are protected using the deleted recoverable VMs list. If the VM recovery request specifies VMs to be recovered, the backup management console may identify recoverable VMs from the VM recovery request that are specified in the deleted recoverable VMs list. If recoverable VMs are identified, the method proceeds to step 224; otherwise the method ends following step 222.

In another embodiment of the invention, the VM recovery request does not specify VMs to be recovered. In such a scenario, the VM recovery request may include a request to recover any deleted VMs that the backup storage device is able to recover. The backup management console may determine whether one or more VMs are specified in the recoverable deleted VMs list. The backup management console may identify the VMs as recoverable VMs.

In step 224, recovery of the identified recoverable VMs is initiated. In one or more embodiments of the invention, the backup management console initiates the recovery of the VMs by obtaining backups associated with each recoverable VM and sending the backups to each production host of the respective recoverable VMs. The backups may be used to restore the recoverable VMs to a previous state. An obtained backup of a recoverable VM may be a most-recent backup of the VM.

In one or more embodiments of the invention, the VM recovery request specifies the previous state of the backup to which a VM is to be backed up. The backup management console may identify a backup of the VM that matches the requested previous state and obtain the identified backup from the backup storage device.

Example

Figure 3A:
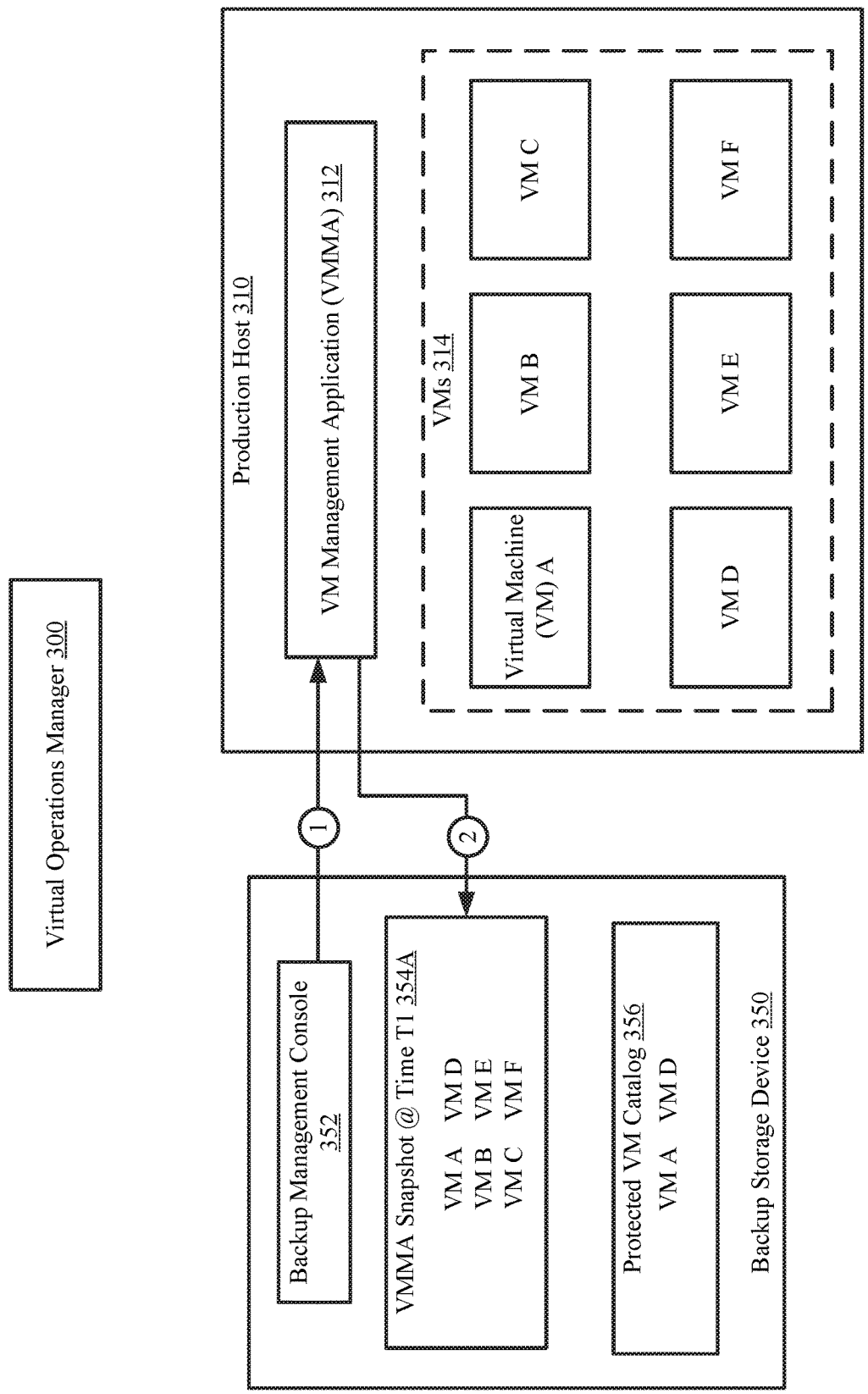
FIGS. 3A-3C shows an example in accordance with one or more embodiments of the invention.
Figure 3B:
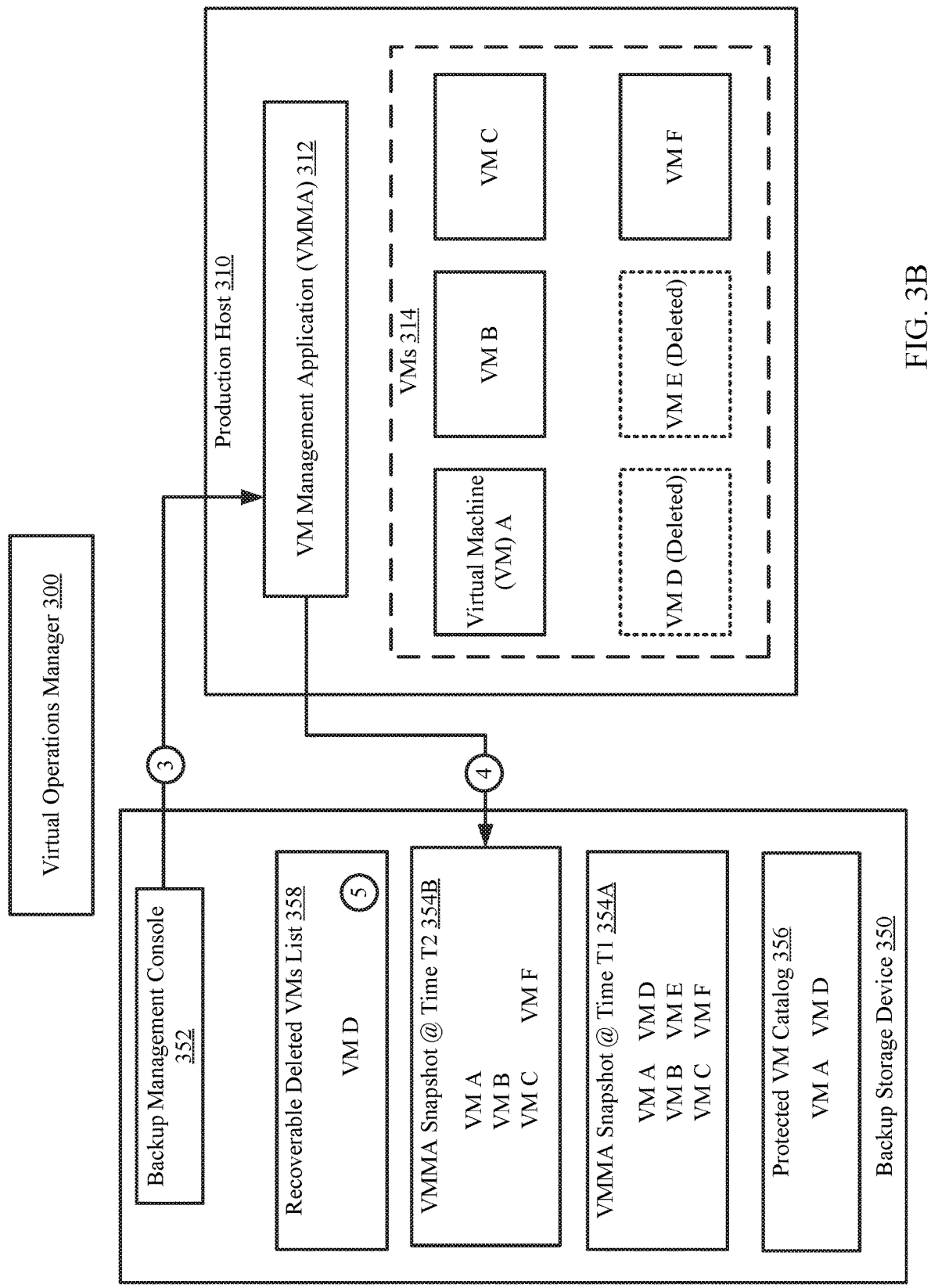
Figure 3C:
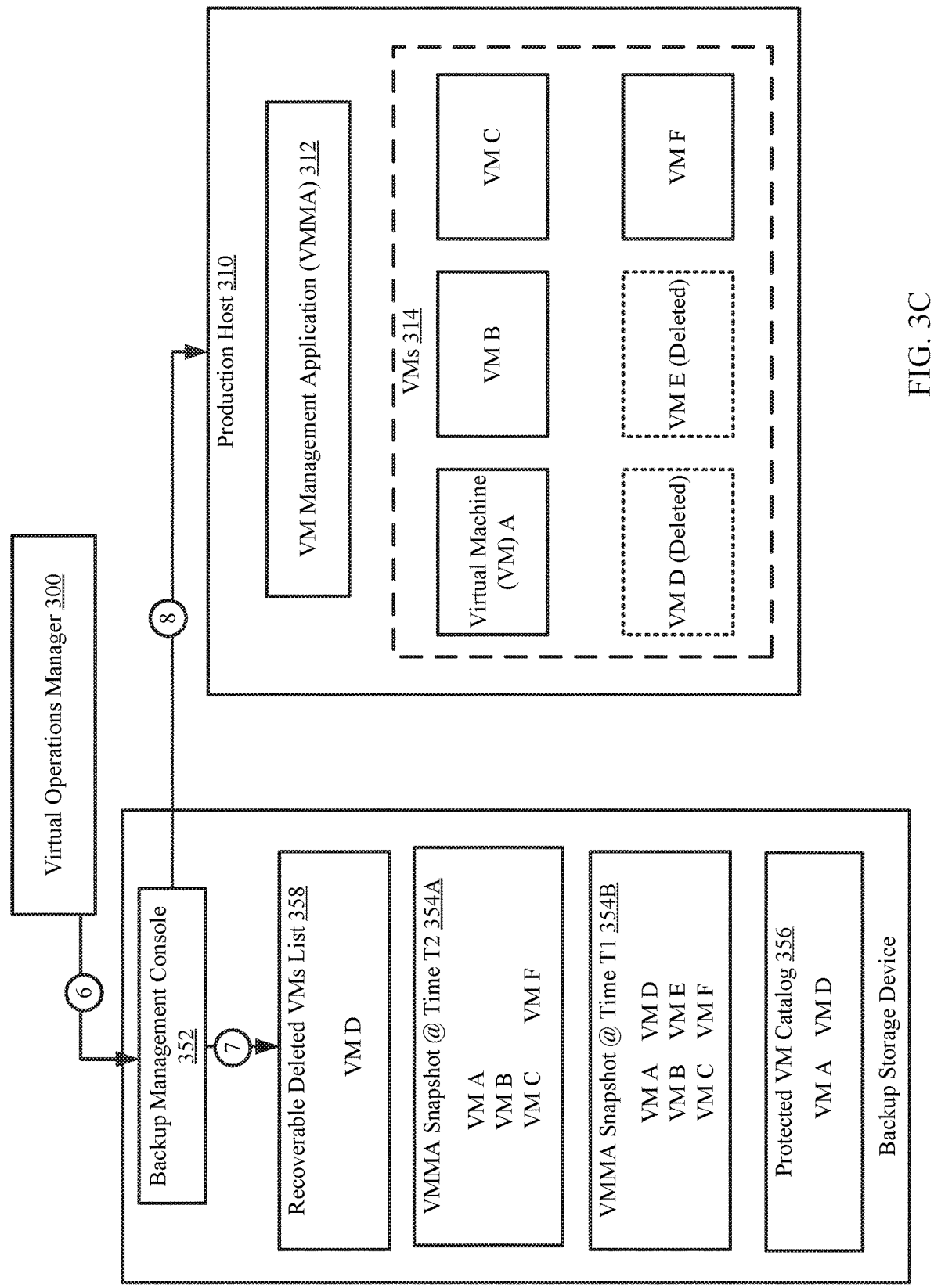

The following section describes an example. The example, illustrated in FIGS. 3A-3C, is not intended to limit the invention. Turning to the example, consider a scenario in which a backup storage device (350) is implementing a recovery policy to recover any deleted VMs managed by a VMMA (312) of a production host (310). The backup storage device (350) may use a backup management console (352) to implement the recovery policy. The backup management console (352) takes a VMMA snapshot of the VMMA (312) to obtain VM identifiers that specify the active VMs managed by the VMMA (312) [1]. The VMMA snapshot (354A) may be stored at a time T1 [2]. The VMMA snapshot, specifying the active VMs (314), includes VM identifiers that correspond to VMs A, B, C, D, E, and F.

At a later point in time, VMs D and E are deleted. The backup management console, continuing the recovery policy, generates a second VMMA snapshot (354A) of the VMMA (312) [3]. The VMMA snapshot (354A) is stored at a point in time T2 [4]. T2 is a point in time after the deletions of VMs D and E. VMMA snapshot at time T2 includes VM identifiers that correspond to VMs A, B, C, and F.

The backup management console (352) may continue the method of FIG. 2A to compare the VMMA snapshot at T1 (354A) to the VMMA snapshot at T2 (354B) to identify the deleted VMs. Because VMs D and E were specified by VMMA snapshot at time T1 (354A) and not VMMA snapshot at T2 (354B), the backup management console (352) determines that VMs D and E are deleted VMs. The backup storage device (350) may compare the identified deleted VMs (VM D and VM E) to a protected VMs catalog (356) to identify the VM identifiers shared by the identified VMs and the protected VM catalog (356). The VM that corresponds to an identified deleted VM and a VM in the protected VM catalog (356) is VM D. An identifier corresponding to VM D is stored in a recoverable VMs list (358) [5]. Based on the recovery policy, the backup management console (352) identifies a setting that specifies not to automatically recover deleted VMs. Subsequently, the backup management console does not recover VM D and stores the recoverable deleted VMs list (358) in memory.

At a later point in time, a virtual operations manager (300) requests to recover any deleted VMs [6]. The backup management console (358) accesses the recoverable deleted VMs list (358) to identify VMs that are deleted and recoverable. The backup management console (352) identifies VM D and initiates a recovery of VM D. The backup management console (352) initiates the recovery by obtaining a most recent backup (not shown) corresponding to VM D and sending the data associated with the backup to the production host (310) to be used for recovery of VM D [8].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the recovery of virtual machines managed by a virtual machine management application (VMMA). The recovery is improved by generating a recoverable deleted VMs list that intersects a list of deleted VMs (obtained using a snapshot of the VMMA) and a protected VM catalog that is maintained by the backup storage device. The recoverable deleted VMs list may be used by the backup storage device to automatically recover the deleted VMs. In this manner, the backup storage device does not depend on the virtual operations manager communicating with clients to identify deleted VMs. Moreover, by independently determining which VMs have been deleted and then determining, using the protected VM catalogue, which of the deleted VMs are recoverable, the backup storage device is able to provide accurate information with low latency to the virtual operations manager about which deleted VMs can be recovered.

Thus, embodiments of the invention may address the problem of inefficient use of computing resources. This problem arises due to the technological nature of the environment in which backup policies are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing virtual machines, the method comprising:
   obtaining, by a backup management console executing on a backup storage device, a first virtual machine (VM) management application (VMMA) snapshot associated with a production host at a first time from a VMMA, wherein the first VMMA snapshot specifies active VMs managed by a VMMA at the first time, and wherein the VMMA executes on the production host;
   obtaining, by the backup management console, a second VMMA snapshot associated with the production host at a second time, wherein the second VMMA snapshot specifies active, VMs managed by the VMMA at the second time;
   identifying, by the backup management console, a VM using the first VMMA snapshot and the second VMMA snapshot;
   making a determination, by the backup management console and using a protected VM catalog, that the backup storage device comprises a backup corresponding to the VM, wherein the protected VM catalog specifies a set of one or more VMs for which there is at least one backup stored in the backup storage device, and wherein the protected VM catalog is generated by the backup management console;
   based on the determination, adding, by the backup management console, a VM identifier corresponding to the VM to a recoverable deleted VMs list;
   selecting, by the backup management console, the VM identifier; and
   in response to selecting the VM identifier, initiating, by the VMMA, recovery of the VM on the production host using the backup corresponding to the VM stored on the backup storage device.

2. The method of claim 1, further comprising:
   prior to selecting the VM, generating the recoverable deleted VMs list, wherein the recoverable deleted VMs list specifies a plurality of VMs each of which is currently deleted from the production host and can be recovered using a corresponding backup on the backup storage device, wherein the VM is one of the plurality of VMs.

3. The method of claim 1, wherein identifying the VM using the first VMMA snapshot and the second VMMA snapshot comprises determining that the VM identifier is presented in the first VMMA snapshot and that the VM identifier is not present in the second VMMA snapshot.

4. The method of claim 1, further comprising:
   receiving a VM recovery request from a virtual operations manager operatively connected to the backup storage device,
   wherein selecting the VM on the recoverable deleted VMs list is initiated in response to the VM recovery request.

5. The method of claim 4, wherein initiating recovery of the VM on the production host comprising sending a notification to the virtual operations manager, wherein the notification specifies the VM.

6. The method of claim 1, wherein the recoverable deleted VMs list is stored in-memory on the backup storage device, wherein the backup storage device is operatively connected to the production host.

7. A non-transitory computer readable medium comprising computer readable program code, which when executed by a computer processor enables the computer processor to perform a method for performing a backup operation, the method comprising:

obtaining, by a backup management console executing on a backup storage device, a first virtual machine (VM) management application (VMMA) snapshot associated with a production host at a first time from a VMMA,
wherein the first VMMA snapshot specifies active VMs managed by a VMMA at the first time, and
wherein the VMMA executes on the production host;

obtaining, by the backup management console, a second VMMA snapshot associated with the production host at a second time,
wherein the second VMMA snapshot specifies active, VMs managed by the VMMA at the second time;

identifying, by the backup management console, a VM using the first VMMA snapshot and the second VMMA snapshot;

making a determination, by the backup management console and using a protected VM catalog, that the backup storage device comprises a backup corresponding to the VM,
wherein the protected VM catalog specifies a set of one or more VMs for which there is at least one backup stored in the backup storage device, and
wherein the protected VM catalog is generated by the backup management console;

based on the determination, adding, by the backup management console, a VM identifier corresponding to the VM to a recoverable deleted VMs list;

selecting, by the backup management console, the VM identifier; and in response to selecting the VM identifier, initiating, by the VMMA, recovery of the VM on the production host using the backup corresponding to the VM stored on the backup storage device.

8. The non-transitory computer readable medium of claim 7, the method further comprising:

prior to selecting the VM, generating the recoverable deleted VMs list,
wherein the recoverable deleted VMs list specifies a plurality of VMs each of which is currently deleted from the production host and can be recovered using a corresponding backup on the backup storage device,
wherein the VM is one of the plurality of VMs.

9. The non-transitory computer readable medium of claim 7, wherein identifying the VM using the first VMMA snapshot and the second VMMA snapshot comprises determining that the VM identifier is presented in the first VMMA snapshot and that the VM identifier is not present in the second VMMA snapshot.

10. The non-transitory computer readable medium of claim 7, the method further comprising:

receiving a VM recovery request from a virtual operations manager operatively connected to the backup storage device,
wherein selecting the VM on the recoverable deleted VMs list is initiated in response to the VM recovery request.

11. The non-transitory computer readable medium of claim 10, wherein initiating recovery of the VM on the production host comprising sending a notification to the virtual operations manager, wherein the notification specifies the VM.

12. The non-transitory computer readable medium of claim 7, wherein the recoverable deleted VMs list is stored in-memory on the backup storage device, wherein the backup storage device is operatively connected to the production host.

13. A system, comprising:
a processor; and
memory comprising instructions, which when executed by the processor, perform a method, the method comprising:

obtaining, by a backup management console executing on a backup storage device, a first virtual machine (VM) management application (VMMA) snapshot associated with a production host at a first time from a VMMA,
wherein the first VMMA snapshot specifies active VMs managed by a VMMA at the first time, and
wherein the VMMA executes on the production host;

obtaining, by the backup management console; a second VMMA snapshot associated with the production host at a second time,
wherein the second VMMA snapshot specifies active VMs managed by the VMMA at the second time;

identifying, by the backup management console, a VM using the first VMMA snapshot and the second VMMA snapshot;

making a determination, by the backup management console and using a protected VM catalog, that the backup storage device comprises a backup corresponding to the VM,
wherein the protected VM catalog specifies a set of one or more VMs for which there is at least one backup stored in the backup storage device, and
wherein the protected VM catalog is generated by the backup management console;

based on the determination, adding, by the backup management console, a VM identifier corresponding to the VM to a recoverable deleted VMs list;

selecting, by the backup management console, the VM identifier; and in response to selecting the VM identifier, initiating, by the VMMA, recovery of the VM on the production host using the backup corresponding to the VM stored on the backup storage device.

14. The system of claim 13, the method further comprising:

prior to selecting the VM, generating the recoverable deleted VMs list,
wherein the recoverable deleted VMs list specifies a plurality of VMs each of which is currently deleted from the production host and can be recovered using a corresponding backup on the backup storage device,
wherein the VM is one of the plurality of VMs.

* * * * *